INVENTORS
Hubert M. Clark
Gilbert H. Drutchas
ATTORNEYS

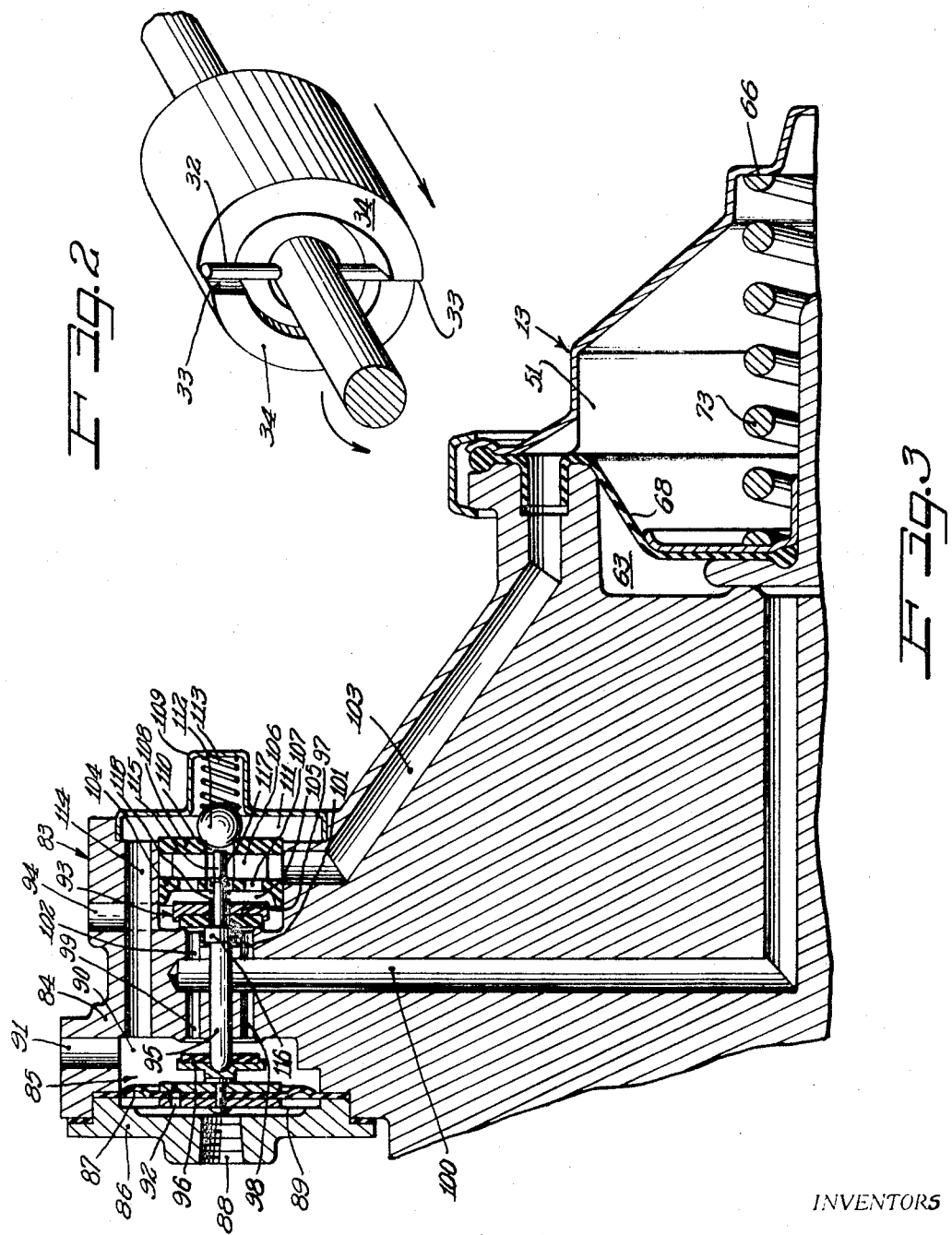

Sept. 16, 1969  H. M. CLARK ET AL  3,467,441
ANTISKID DEVICE
Filed June 13, 1967  4 Sheets-Sheet 3
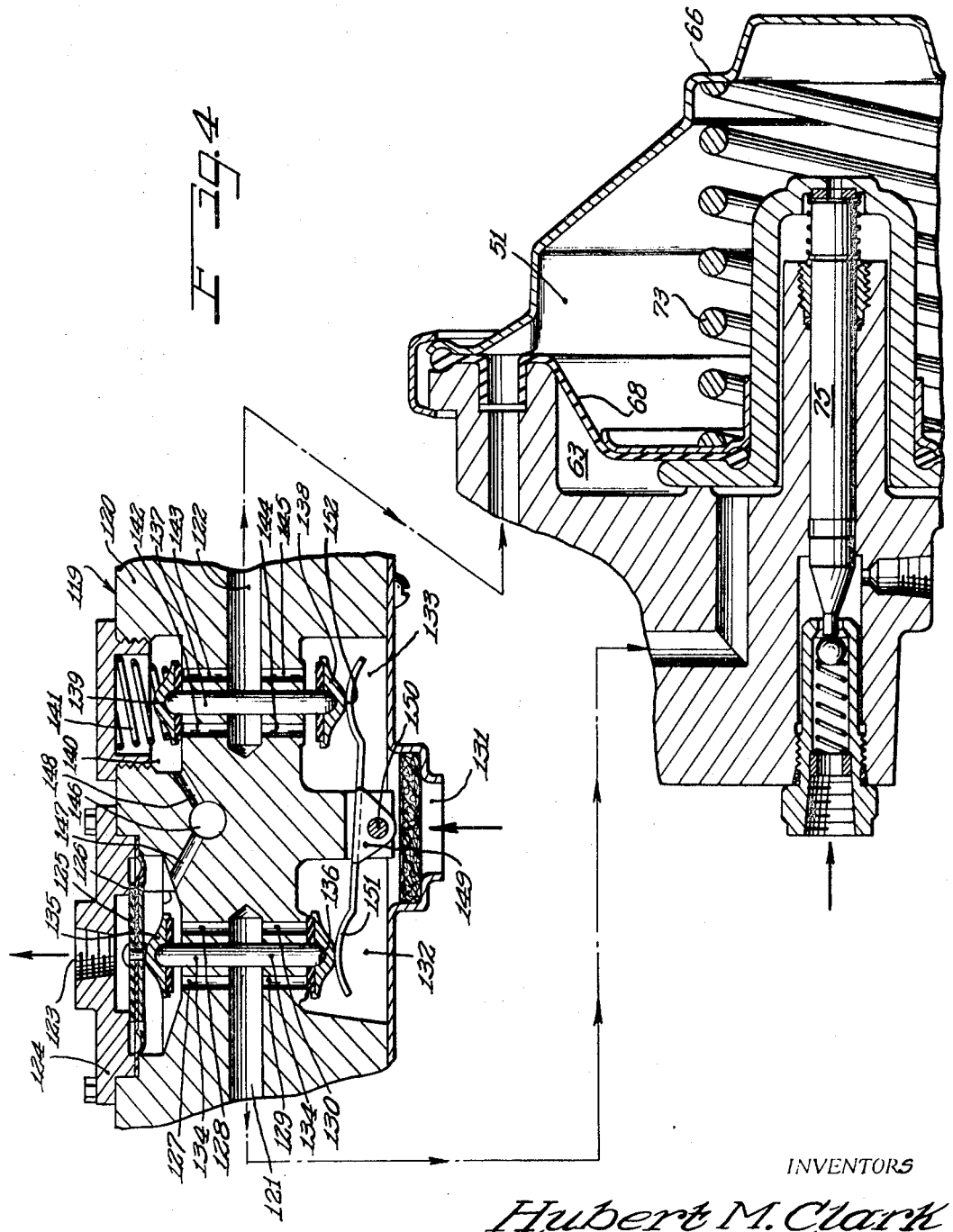
INVENTORS
Hubert M. Clark
Gilbert H. Drutchas
BY Hill, Sherman, Meroni, Gross & Simpson
ATTORNEYS INVENTORS
Hubert M. Clark
Gilbert H. Drutchas BY Hill, Sherman, Meroni, Gross + Simpson
ATTORNEYS United States Patent Office 3,467,441
Patented Sept. 16, 1969

3,467,441
ANTISKID DEVICE
Hubert M. Clark and Gilbert H. Drutchas, Birmingham, Mich., assignors to TRW Inc., Cleveland, Ohio, a corporation of Ohio
Filed June 13, 1967, Ser. No. 645,654
Int. Cl. B60t 8/02, 15/02, 13/22
U.S. Cl. 303—21                                 3 Claims

ABSTRACT OF THE DISCLOSURE

An antiskid brake system having sensing means for comparing the deceleration of the braked wheels of a vehicle with the linear deceleration of the vehicle and for developing a control signal when the angular deceleration of the wheels exceeds a critical value. The signal developed by the deceleration sensing device is applied through a pressure distributing means to a vacuum operated actuator. The power developed by the vacuum actuator is then applied to a valve means to interrupt and release the hydraulic pressure normally applied to the wheel brakes during a braking procedure. A pressure distributing means is utilized to apply vacuum or atmosphere or both to opposite sides of a movable diaphragm associated with the vacuum actuator to achieve maximum power therefrom with minimum diaphragm size.

FIELD OF THE INVENTION

The field of art to which this invention pertains is a control mechanism for regulating hydraulic pressure applied to the braking wheels of a vehicle in such a manner as to allow a maximum braking effect while avoiding wheel lock or skidding conditions.

SUMMARY

An important feature of this invention is the provision of an antiskid brake system having an improved means for utilizing a control signal from a deceleration sensing device to control the hydraulic pressure normally applied to the braking system during a typical braking action. Another feature of the invention is the provision of an antiskid brake control device utilizing a vacuum actuator for controlling the operation of a valve means to regulate the hydraulic pressure delivered to the braking system wherein the vacuum actuator has an increased power and involves a minimum size diaphragm and reduced manufacturing costs.

An object of the invention is the provision of a pressure distributing means for more effectively regulating the flow of vacuum and atmospheric pressure to the low and high pressure chambers of a vacuum actuator.

Another object of this invention is to provide an improved means for actuating a pressure distributing means in response to an atmosphere control signal developed at a deceleration sensing device.

A still further object of the invention is to provide a pressure distributing means for an actuator associated with an antiskid control device to selectively apply vacuum to one side of the actuator diaphragm and atmosphere to the other side of the actuator diaphragm and to substantially, instantaneously switch the connections of the vacuum and atmosphere supplies to the opposite sides of the actuator diaphragm.

Another object of the invention is to provide a vacuum actuator for an antiskid control device where the actuator has a housing divided by an actuator diaphragm into first and second chambers and wherein the diaphragm is spring biased in the second chamber to move a valve means from a closed to an open position within the hydraulic brake system and wherein a pressure distributing means is utilized to apply vacuum to the first chamber and atmosphere to the second chamber to assist the biasing force of the spring means for opening the valve means against the hydraulic fluid pressure applied thereto.

Other and further objects of this invention will be apparent to those skilled in this art from the following detailed description and the annexed sheets of drawings which show several embodiments of the invention.

BRIEF DESCRIPTION OF THE DRAWINGS

FIGURE 2 is an elevational perspective view of the deceleration sensitive cylindrical mass as utilized in the sensing device of FIGURE 1;

FIGURE 3 is a sectional view of a portion of the antiskid brake control system showing a pressure distributing valve means for simultaneously applying pressure and vacuum to both sides of the actuator diaphragm and for reversing the pressure and vacuum cycles in accordance with the signal received from the deceleration sensitive device;

FIGURE 4 is a sectional view of a portion of the antiskid brake control system similar to the system shown in FIGURE 1 and showing in detail an alternate embodiment of the pressure distributing means for applying pressure and vacuum to both sides of the actuation diaphragm and for selectively reversing the cycle in accordance with a signal sensed at the deceleration sensing means;

DESCRIPTION OF THE PREFERRED EMBODIMENTS

Figure 1:
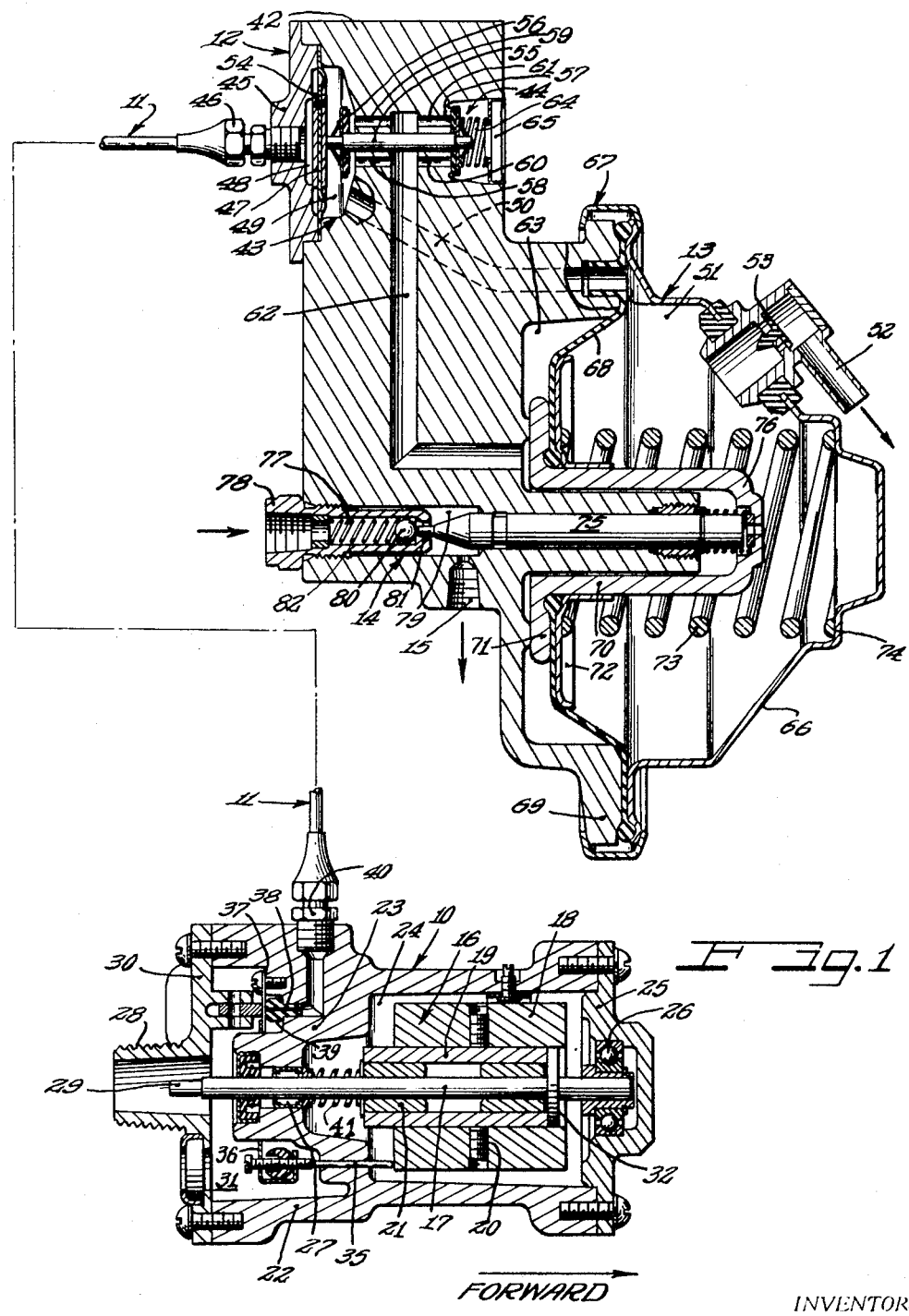
FIGURE 1 is a sectional view of an antiskid brake system according to the present invention and showing the operation of the deceleration sensing device and the connection of the sensing device to a pressure distributing means for applying vacuum and atmosphere to the desired chambers of a vacuum actuator and showing the valve control means in the hydraulic brake line in an opened position.

The antiskid control device of this invention includes a sensor 10 for comparing the angular deceleration of the vehicle wheels with the linear deceleration of the vehicle body to generate a signal responsive to an impending wheel lock condition. The sensor unit 10 is connected through an air line 11 to a pressure distributing means 12. The pressure distributing means responds to the signal present in the air line 11 to permit the development of a vacuum or an atmospheric pressure at opposite sides of an actuator diaphragm within an actuator system 13. The actuator system 13 then controls a valve means for regulating the hydraulic pressure delivered to the rear wheel brake lines. The rear wheel brake lines are connected at an outlet socket 15, and the valve means 14 is responsive to the actuator system 13 to cut off the flow of brake fluid from the master cylinder through the outlet 15 and to release pressure built up on the brake lines to release the braking means associated with the rear wheel brakes. While the particular system shown in these drawings is designed to act on the rear wheel brake circuit only, it is clear that if a greater degree of brake control is desired, the front wheel brakes could be regulated by a similar system.

The basic element of the sensor 10 is a cylindrical inertial mass 16 which is free to both rotate and slide axially on a shaft 17. The mass 16 is formed in two portions, an outer inertial sleeve 18 and an inner sleeve 19. The outer sleeve 18 is securely fastened to the inner sleeve 19 by a number of set screws 20 or the like. Bushings 21 are provided between the inner cylinder 19 and the shaft 17 to minimize friction during both rotary and sliding motions.

The housing of the sensor 10 consists generally of a cylindrical casting 22 which has a partition 23 formed thereacross to define a cavity 24 within which the inertial mass 16 is carried and is operated. The cavity 24 has an end plate 25 mounted thereon to close the cavity and to provide a support for the shaft 17.

The shaft 17 is carried in bearings 26 and 27 which are mounted within the end plate 25 and the partition 23, respectively. The mounting of the shaft within the bearings 26 and 27 is in a manner well understood in the art, and the shaft 17 is driven on these bearings at some fixed multiple of the rear wheel rotational speed through a flexible shaft (not shown) to a geared connection with the vehicle propeller shaft. The flexible drive shaft may be connected through an input nipple 28 to the shaft 17 at the drive end portion 29 thereof. It is noted that the nipple 28 is formed integrally with a plate 30 similar to the plate 25 to cover a cavity 31 formed at the opposite side of the partition 23 as compared to the cavity 24.

The sensor 10 is mounted so that its shaft is parallel to the longitudinal axis of the vehicle with the drive shaft connection toward the rear. Accordingly, the forward motion of the vehicle is as indicated in FIGURE 1. The linear deceleration of the vehicle urges the mass 16 toward the front of the vehicle where it is restrained by a drive pin 32 which is fixedly mounted to the shaft. The drive pin 32 is normally in contact with abutments 33 which are formed as the end face of inclined planes or cams 34. The contacting of the drive pin 32 with the abutments 33 causes the mass 16 to rotate in unison with the shaft 17. Since the rotational speed of the shaft is proportional to the rotational speed of the rear wheels of the vehicle, the angular deceleration of the shaft 17 is thereby proportional to the rear wheel deceleration during braking.

The design of the inertial mass 16, its weight, diameter and lead angle of the face cam 34 is such that the axial force component of the cam 34 acting on the pin 32 due to rotational inertia during deceleration is equal in magnitude, but opposite in direction, to the axial force due to linear deceleration during optimum vehicle braking. Hence, as long as the angular deceleration remains proportional to the linear deceleration of the slowing vehicle with both decelerations reaching zero simultaneously, no wheel lock or vehicle skid will ensue. In this case, the sensor mass and drive shaft have no relative motion occurring between them and, hence, the antiskid control system will not be actuated.

When the rear brake pressure is excessive for the existing vehicle tire-to-road adhesion factor, the angular deceleration of the rear wheels will reach zero before any or all of the vehicle deceleration has been absorbed, and these locked wheels will cause a vehicle skid. In this case, the mass 16 tends to remain in rotation as the shaft 17 is being brought to a halt by its connected drive to the rear wheels.

The rotational inertia of the mass 16 is then translated into a rearward force by the lead angle of the face cam 34 acting on the drive pin 32. Since the forward force of a lagging linear deceleration of the mass 16 cannot sustain this translated rearward force, the mass 16 moves toward the rear. The rearward motion of the mass 16, in turn, moves a probe 35 and its associated nut rearward causing a spring member 36 to be deflected to the rear about its anchor 37, thus, opening a passage 38 in a valve seat 39 to the atmosphere.

Atmosphere is received through the nipple 28 and via the cavity 31 to the passage 38 in the valve seat 39 and from the passage 38 to a coupling member 40 and hence to the air line 11. Accordingly, the presence of an atmosphere signal in the air line 11 may be said to be a sensor signal which is responsive to the deceleration comparator means, namely the combination of the mass 16 and the drive pin 32 together with the cam 34.

When rear wheel rotation and, hence, the sensor shaft rotation resumes, the drive pin 32 leaves the face cams 34 and contacts the abutments 33 of the mass 16. This removes the excess force acting on the mass 16 due to angular deceleration allowing the forward force due to linear deceleration, together with a coil spring 41 to take over which moves the mass 16 and, hence, the probe 35 forward permitting the spring member 36 to close the passage 38 in the valve seat 39. Therefore, an atmosphere signal is present in the air line 11 only during the sensing of a wheel lock or potential skid condition.

The pressure distributing means 12 shown in FIGURE 1 includes a housing 42 which is formed integrally with the housing of the actuator 13 and valve means 14. The pressure distributing means essentially consists of a first cavity 43 which is formed on one side of the housing 42 and a second cavity 44 which is formed on the other side of the housing. The cavity 43 is closed by a cover plate 45 to which is connected a coupling 46 associated with the air line 11. Accordingly, the deceleration responsive atmosphere signal is delivered through the air line 11 to the cavity 43.

The cavity 43 is divided by a resilient diaphragm 47 into first and second chambers 48 and 49. The chamber 48 is exposed directly to the air line 11 through the coupling 46, and the chamber 49 is exposed directly through a passageway 50 to a chamber 51 associated with the actuator 13. The chamber 51 is continuously evacuated through a coupling 52 having a resilient check valve 53. The coupling 52 may be connected to a suitable vacuum source such as the intake manifold of a combustion type engine or the like. Hence, the chamber 49 is maintained in a vacuum state at all times, and accordingly any atmosphere pressure received in the chamber 48 will create a pressure differential across the diaphragm 47 for moving the diaphragm from the left face of the cavity 43 to the right therefrom.

In the absence of an atmosphere signal from the air line 11, the diaphragm 47 is maintained in an equilibrium or non-pressure differential condition by means of a small opening 54 formed within the diaphragm and interconnecting the chambers 48 and 49. Accordingly, after an atmosphere signal is disconnected at the passageway 38 of the sensor 10, the chamber 48 will be evacuated by the same source which evacuates the chamber 49. However, when an atmosphere signal is received at the coupling 46 and delivered to the chamber 48, a pressure differential is set up across the diaphragm 47 for moving the diaphragm to the right.

The motion of the diaphragm 47 to the right contacts a valve stem 55 of a dual valve means which consists of a stem 55 and first and second valve heads 56 and 57. The valve head 56 opens and closes a series of passageways 58 and 59, and the valve head 57 opens and closes a second series of passageways 60 and 61. All four of these passageways 58 through 61 are connected directly to a main passageway 62 which leads to a pressure chamber 63 formed within the actuator 13.

The valve stem 55 is spring biased against the face of the diaphragm 47 by a spring 64 which is disposed within the cavity 44 for that purpose. It is noted that the cavity 44 is connected directly to atmosphere through an opening 65 formed within the housing 42.

The valve stem 55 is slidable within a passage of the housing 42 which extends between the cavities 43 and 44. Accordingly, movement of the valve stem 55 from the extreme left to the extreme right position and vice versa, serves to connect either atmosphere from the cavity 44 to the main passageway 62 or vacuum from the cavity 43 via the passageway 50 to the main passageway 62. Therefore, when an atmosphere skid detection signal is received within the chamber 48, the diaphragm 47 moves to the right and closes the passageways 58 and 59 opening the passageways 60 and 61 and permitting atmosphere to enter the main passageway 62. In the absence of a skid responsive atmosphere signal in the chamber 48, the spring 64 biases the valve stem to the left and against the diaphragm 47 closing the passageways 60 and 61 and opening the passageways 58 and 59 thereby permitting the vacuum from the chamber 49 to pass into the main passageway 62.

The actuator 13 consists of a housing, part of which is formed integrally with the housing 42 and part of which consists of a disk or cover member 66 which is rigidly attached to the housing at a rim 67. A resilient diaphragm 68 is sealably maintained between the cover 66 and a flange 69 of the housing portion 42 and divides the interior of the housing into high and low pressure actuation chambers 63 and 51, respectively. The diaphragm is sealably secured to a central cap-shaped member 70 between a flange 71 and a spring seat 72. The spring seat 72 compresses the diaphram in position about the cap member 70, and the assembly is held in position by means of a coil spring 73 which is seated against the seat 72 at one end and against a circular wall 74 at the opposite end thereof. It is apparent that vacuum from the line 52 will continuously evacuate the chamber 51, while the pressure distributing device 12 will alternately apply pressure or vacuum to the chamber 63 depending upon whether a skid responsive signal is received from the sensor 10. In the presence of a skid responsive signal, atmosphere applied through the passageway 62 to the chamber 63 will be sufficient to move the diaphragm 68 against the coil spring 73. When the skid responsive signal is removed, vacuum is reapplied through the passageway 62 to the cavity 63 for retracting the diaphragm 68 to the position shown in FIGURE 1.

This movement of the diaphragm and cap member 70 actuates a piston 75 which is connected to the cap member 70 at the end 76 thereof. The piston 75 operates the valve means 14 within the hydraulic brake line. Hydraulic pressure from a master cylinder, as is well understood, enters a chamber 77 through a fitting 78 and normally enters an accumulator chamber 79 beyond a ball 80 which is actuated by the end of the piston 75. Hydraulic pressure then extends from the accumulator chamber 79 to the rear brake circuit through the outlet 15.

During optimum braking, the actuator diaphragm 68 is vacuum balanced, and the accumulator piston 75 is held in the position shown by the spring 73. In this position, the ball 80 is held off a seat 81 formed within the fitting 78, and the volume of the accumulator chamber 79 is at a minimum. Thus, full hydraulic brake pressure from the master cylinder acts on the rear wheel brake cylinders as if the skid control device is not present.

When a premature vehicle rear wheel lock and hence potential skid occurs, the actuator diaphragm 68 is unbalanced, and the force of the spring 73 is removed from the accumulator piston 75. The hydraulic brake pressure in the accumulator chamber 79 acts upon the piston moving it to the right permitting a spring 82 to seat the ball 80 cutting off the master cylinder from the accumulator chamber 79 and from the rear brake circuit. This piston motion also increases the volume of the accumulator chamber 79 and, accordingly, draws hydraulic fluid from the rear brake circuit, reducing the circuit pressure and removing the tendency toward rear wheel lock.

In the embodiment of FIGURE 1, it is noted that the diaphragm 68 is moved from the position shown in FIGURE 1 to an extended position at the right portion of the housing 66 by the presence of atmosphere pressure in the chamber 63 and substantial vacuum in the chamber 51. However, the diaphragm 68 is moved to the retracted position shown in FIGURE 1 by the equalizing of pressures between the chambers 63 and 51. That is, both the chambers 51 and 63 are maintained at substantial vacuum when the diaphragm 68 is moved to its retracted position. Accordingly, the force moving the diaphragm to the retracted position is generated solely by the presence of the coil spring 73.

However, it is appreciated that the biasing force of the coil spring 73 could be reduced if a pressure differential were established across the diaphragm 68 to assist the spring 73 in moving the diaphragm to the retracted position. It can also be appreciated that if a smaller spring 73 were employed, due to the use of a pressure differential to assist the movement of the diaphragm 68, that a smaller diaphragm could be employed to move the diaphragm from the retracted position to the extended position against the spring face at the righthand portion of the housing 66.

In the embodiment shown in FIGURE 3, a pressure distributing means 83 is employed which maintains the proper pressure differential across the diaphragm 68 both in moving the diaphragm from the position shown in FIGURE 3 to the extended position at the righthand portion of the housing 66, and in moving the diaphragm 68 from the extended position to the position shown in FIGURE 3.

The first motion is accomplished by applying pressure to the chamber 63 and vacuum to the chamber 51, and the second motion is accomplished by reversing the application of pressure and vacuum, namely by applying pressure to the chamber 51 and vacuum to the chamber 63.

The pressure distributing means 83 includes a housing portion 84 having a cavity 85 formed at the sensor end thereof. The cavity 85 is closed by a cover plate 86, and a diaphragm 87 is maintained in position across the cavity 85 by means of the cover plate 86. The sensor device as shown in FIGURE 1 is connected to the cover plate 86 at a threaded inlet 88. Accordingly, an atmosphere signal generated at the sensor 10 will be applied through the opening 88 to a chamber 89 formed to the left of the diaphragm 87. A chamber 90 formed at the right portion of the diaphragm 87 is connected directly to a vacuum supply through a passageway 91. A small passageway 92 is formed within the diaphragm 87 and communicates the chambers 89 and 90 such that in the absence of an atmosphere signal from the sensor 10, the chambers 89 and 90 will be maintained at a substantially equalized pressure.

A cavity 93 is formed at the righthand portion of the housing 84 and is connected directly to atmosphere through a passageway 94.

A valve stem 95 is slidably operable within the housing 84 similar to the valve stem 55 as shown in FIGURE 1. The valve stem 95 has a head 96 and a further head 97 disposed at opposite ends thereof similar to the mounting of the heads 56 and 57 in FIGURE 1.

A first pair of passageways 98 and 99 are connected from the chamber 90 to a main passageway 100, and a second pair of passageways 101 and 102 are connected from the atmosphere chamber 93 to the main passageway 100. It is apparent, therefore, that the functioning of the valve means which includes the valve stem 95 and the heads 96 and 97 insofar as thus described, is similar to the functioning of the valve stem 55. In particular, the movement of the valve stem to the left as shown in FIGURE 3 opens the passageways 98 and 99 from the vacuum supply at the passageway 91 to the main chamber 100. Also, the movement of the valve stem 95 to the right, closes the passageways 98 and 99 and shuts off the vacuum from the passageway 100 and simultaneously opens the passageways 101 and 102 and connects the atmosphere supply at the passageway 94 to the main passageway 100. Accordingly, insofar as thus described, the valve stem 95 serves to switch the connection of the passageway 100 between vacuum and atmosphere. This switching applies the necessary pressure differential across the diaphragm 68 to move the diaphragm from the position shown in FIGURE 3 to the extended position at the righthand portion of the housing 66.

However, the embodiment shown in FIGURE 3 has a second main passageway 103 which is connected to the chamber 51 of the actuator 13. The pressure distributing means 83 of this embodiment also incorporates means for switching the connection of the chamber 103 between vacuum and atmosphere and to further coordinate this switching action with the switching action of the main chamber 100 to produce the maximum pressure differential across the diaphragm 68 for moving the diaphragm 68 from the extended position at the righthand portion of the housing 66 to the retracted position as shown in FIGURE 3.

The means for switching the passageway 103 between atmosphere and vacuum includes a partition 104 which is disposed within the cavity 93 and which divides the cavity 93 into first and second chambers 105 and 106. The partition 104 has a series of openings 107 which interconnect the chambers 105 and 106. In addition, a further partition 108 is formed across the end portion of the cavity 93, and a cap member 109 is disposed outwardly of the partition 108. The partition 108 has an opening 110 which communicates the chamber 106 with a chamber 111 formed within the cap portion 109, and a ball 112 is maintained seated in the opening 110 by a coil spring 113 disposed between the ball and the end portion of the cap 109 as shown.

While the chamber 106 is communicated directly to atmosphere through the passageway 94, the chamber 111 formed within the cap member 109 is communicated directly to vacuum by a passageway 114 which interconnects the chamber 111 with the passageway 91.

The valve stem 95 has an extension 115 which extends through the valve head 97 and the partitions 104 and 108 to the vicinity of the ball 112.

Two collars are formed about the valve stem 95. A first collar 116 engages the valve head 97 at the lefthand face thereof and a second collar 117 provides a seat for a spring 118 which biases the valve head 97 into the position shown in FIGURE 3.

When the valve stem 95 moves to the right from the position shown in FIGURE 3, the head 97 contacts the partition 104 and seals off the passageways 107 such that atmosphere from the chamber 105 is no longer communicated with the chamber 106. At the same time, the stem extension 115 contacts the ball 112 and unseats the ball from the opening 110 thereby communicating the chamber 111 with the chamber 106. As the chamber 111 is continuously evacuated, this connects vacuum through the chamber 106 to the passageway 103. Prior to the movement of the valve stem 95 to the right as described, atmosphere from the passageway 94 is communicated through the chamber 105 and the openings 107 in the partition 104 to the passageway 103. Accordingly, the same movement of the valve stem 95 which switches the connection of the passageway 100 between vacuum and pressure simultaneously switches the connection of the passage 103 between pressure and vacuum, respectively.

It is understood, therefore, that when it is desired to move the diaphragm 68 from the position shown in FIGURE 3 to the extended position at the righthand portion of the housing 66, that the valve stem 95 is moved to the right closing the passageways 98 and 99 and opening the passageways 101 and 102 thereby connecting atmosphere to the chamber 100 and, hence, to the actuation chamber 63. Simultaneously, the openings 107 in the partition 104 are closed, and the ball 112 is unseated, and vacuum is connected from the passageway 114 through the chamber 111 to the chamber 106 and to the passageway 103.

When it is desired to move the diaphragm 68 from the extended position at the righthand portion of the chamber 66 to the position shown in FIGURE 3, the valve stem 95 is simply moved to the left as shown in FIGURE 3; vacuum from the chamber 90 is communicated with the passageway 100, and atmosphere from the passageway 94 is communicated through the chamber 105 and the openings 107 to the passageway 103. Accordingly, the proper pressure differential is established whichever is the desired motion of the diaphragm. This reduces the size of the coil spring 73 and, accordingly, reduces the size of the diaphragm which is needed to overcome the bias of the coil spring 73.

A further embodiment of the pressure distributing device 83 is shown in FIGURE 4 and accomplishes the same function as the device 83. In particular, the pressure distributing device 119 has a housing 120 with first and second main passageways 121 and 122. The first passageway 121 is connected to the chamber 63 of the actuator, and the second passageway 122 is connected to the chamber 51 of the actuator. The deceleration sensor, as shown in FIGURE 1, is connected to an inlet 123 which is formed within a cover plate 124 to hold a diaphragm 125 in position within a cavity 126. The cavity 126 is similar to the cavity 85 shown in FIGURE 3, and the positioning and the functioning of the diaphragm 125 is also similar to the positioning and functioning of the diaphragm 87.

A first pair of passageways 127 and 128 connect the chamber 126 to the passageway 121, and a second pair of passageways 129 and 130 connect atmosphere to the passageway 121. The atmosphere is derived through an opening 131 formed within the housing 120 and communicated with first and second chambers 132 and 133 disposed adjacent thereto.

A dual headed valve includes a valve stem 134 having a first valve head 135 and a second valve head 136. The positioning and movement of the valve stem 134 is similar to the positioning and movement of the valve stem 95 as shown in FIGURE 3, and from the above discussion it is apparent that the opening of the valve head 135 connects the chamber 126 to the passageway 121, and the opening of the valve head 136 connects the chamber 132 to the passageway 121, while closing the valvehead 135 disconnects the chamber 126 from the passageway 121. In this way, the movement of the valve stem 134 switches the communication of the passageway 121 between the vacuum supply of the chamber 126 and the atmosphere supply of the chamber 132. A second dual operated valve means is shown in the device 119 and includes a valve stem 137 and first and second valve heads 138 and 139. The head 139 is operable within a cavity 140 and is spring biased in the direction shown by a coil spring 141. The cavity 140 is connected through a pair of passageways 142 and 143 to the main passageway 122.

Similarly, the valve head 138 operates within the chamber 133 and communicates the chamber 133 with the main passageway 122 by means of first and second passageways 144 and 145. It is noted that both the chambers 126 and 140 are connected to a vacuum source 146 which is communicated with the respective chambers by connecting passageways 147 and 148. It is apparent that the closing of the valve head 139 as shown in FIGURE 4 closes off the vacuum source of the chamber 140 from the passageway 122 and opens the atmosphere source from the chamber 133 to the passageway 122. Therefore, the movement of the valve stem 137 switches the connection of vacuum and atmosphere to the passageway 122.

The two heads 136 and 138 of the respective valve means are interconnected by a lever operator 149 which is pivoted at a point 150 to the housing 120 and which has a first arm 151 contacting the head 136 and a second arm 152 contacting the head 138. The biasing force of the spring 141 urges the valve stem 137 into the position shown and therefore biases the valve stem 134 into the opposite position as also shown in FIGURE 4. However, the presence of an atmosphere signal in the inlet 123 moves the diaphragm 125 into the chamber 126 and forces the valve stem 134 against the biasing force of the spring 141 to close the head 135, open the head 136, close the head 138 and open the head 139. This action communicates atmosphere to the passageway 121 and communicates vacuum to the passageway 122 for applying the proper differential across the diaphragm 68 to move the diaphragm 68 from the position shown in FIGURE 4 to the extended position at the righthand portion of the housing 66. Accordingly, the presence or absence of an atmosphere sensor signal at the opening 123 determines in which direction the pressure differential across the diaphragm is orientated and accordingly whether the diaphragm will move to or from the retracted position shown in FIGURE 4. As in the case of the system shown in FIGURE 3, the switching of the pressure differential orientation reduces the size of the coil spring 73 required to operate the valve piston 75 and accordingly reduces the size of the diaphragm 68 required to oppose the biasing of the spring 73 when the anti-skid system is called into operation.

Figure 5:
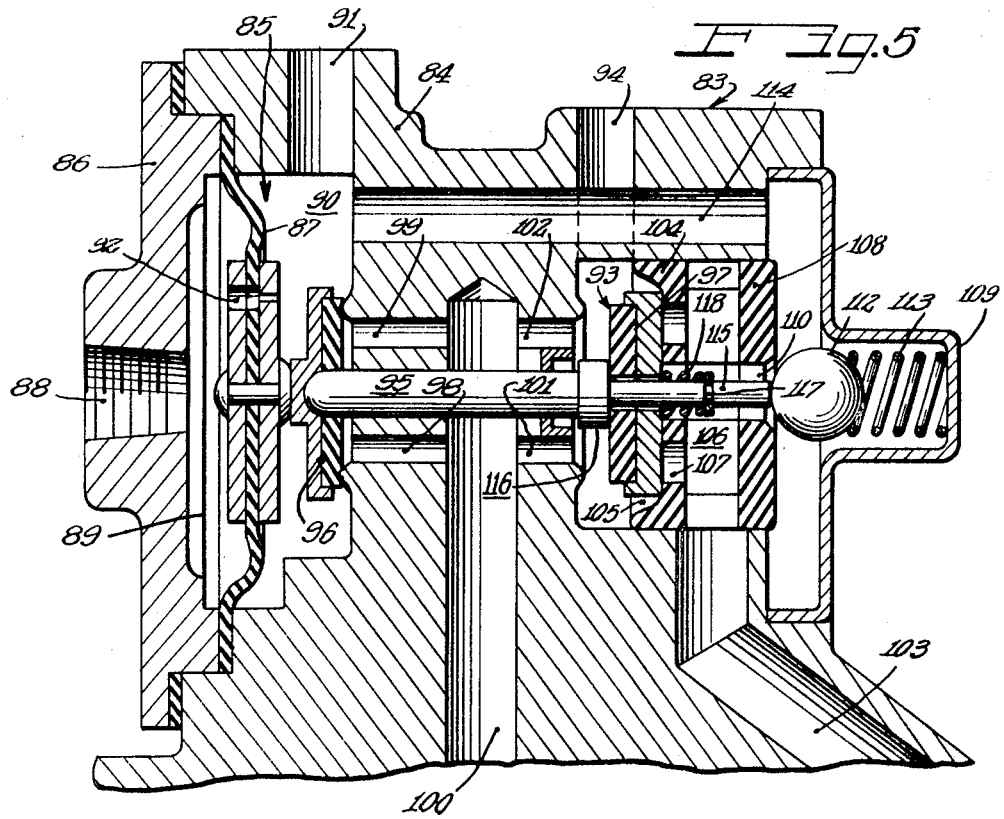
FIGURE 5 is an enlarged sectional view of the pressure distributing means shown in FIGURE 2 and showing in particular the alternate cycle of operation wherein the vacuum and pressure chambers of FIGURE 2 are reversed.
Figure 6:
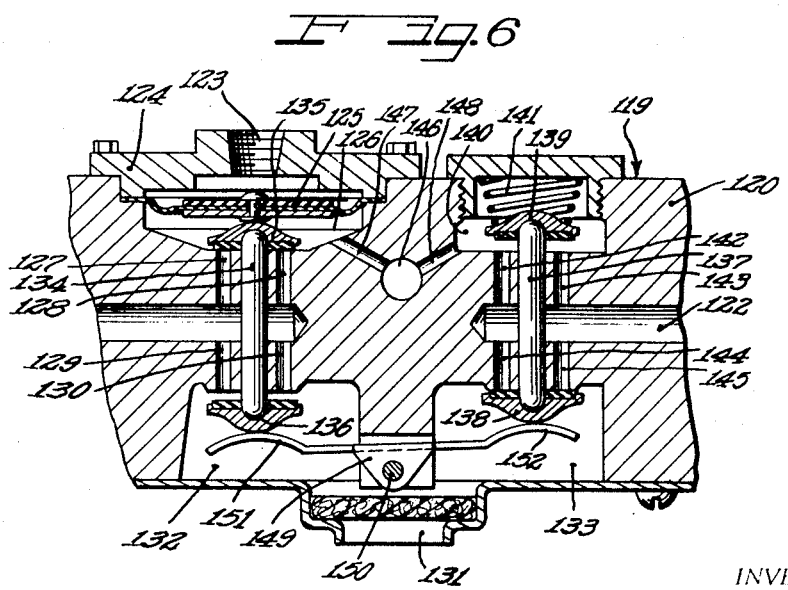
FIGURE 6 is a sectional view of a pressure distributing means of the type shown in FIGURE 4 and illustrating the alternate positioning of the valve means therein to reverse the application of vacuum and atmosphere to the respective sides of the actuator diaphragm.

While discussion of the functioning of the pressure distributing means 83 and 119 has been directed primarily to FIGURES 3 and 4, all of the reference numerals in these figures have been carried over to FIGURES 5 and 6 which show the opposite functioning position of the respective pressure distributing devices and which visually displays the desired switching action between the respective actuator chambers.

We claim:
1. A pressure distributing device comprising:
   a valve housing,
   said valve housing having a sensor inlet, a vacuum supply inlet and an atmospheric supply inlet, and having first and second outlets,
   first and second passageways communicating said vacuum supply inlet with said first and second outlets, respectively, third and fourth passageways communicating said atmospheric supply inlet with said second and first outlets, respectively,
   valve means having two operating positions and being moved to one of said two operating positions by the presence of a signal at said sensor inlet and being moved to the other of said operating positions by the absence of a signal at said sensor inlet,
   said first operating position of said valve means including the closing of said second and fourth passageways and the simultaneous opening of said first and third passageways,
   said second operating position of said valve means including the opening of said second and fourth passageways and the simultaneous closing of said first and third passageways,
   said first passageway having a first valve seat formed between the first outlet and the vacuum inlet,
   said fourth passageway having a second valve seat formed between the first outlet and the atmosphere inlet,
   a first reciprocal valve actuator mounted within said housing and having dual valve heads cooperable with said first and second valve seats for closing one and simultaneously opening the other of said first and fourth passageways,
   said second passageway having a third valve seat formed between said second outlet and said vacuum inlet,
   said third passageway having a fourth valve seat formed between said second outlet and said atmosphere inlet, a second reciprocal valve actuator separate from said first reciprocal valve actuator mounted within said housing and having dual valve heads cooperable with said first and second valve seats for closing one and simultaneously opening the other of said second and third passageways, and
   means to simultaneously alternately operate said first and second reciprocal valve actuators to open the vacuum associated seat of one of said actuators and to open the atmosphere associated seat of the other actuator while closing the remaining seats whereby during said first operating position said vacuum supply inlet is connected to said first outlet and said atmospheric supply inlet is connected to said second outlet and whereby during said second operating position said vacuum supply inlet is connected to said second outlet and said atmospheric supply inlet is connected to said first outlet.

2. A pressure distributing device in accordance with claim 1 wherein a valve head of each of the actuators is disposed at one side of the housing and wherein a rocker arm is pivotally mounted to the housing intermediate the valve heads and having first and second arms each contacting one of the valve heads, means for biasing each of the valve heads toward the contacting arm and means for pivotally actuating the rocker arm to alternately depress one and release the other of said valve heads.

3. A pressure distributing device in accordance with claim 2 wherein the means for biasing one of the said valve heads toward the associated contacting arm comprises a sensor diaphragm disposed in contacting relationship with the actuator of said one valve head and wherein said vacuum supply inlet is connected to one side of the diaphragm and wherein a controlled atmosphere supply is connected to the other side of the diaphragm whereby the regulation of atmosphere supply to said sensor diaphragm actuates all four of said valve heads simultaneously to alternately deliver vacuum to one and atmosphere to the other of said outlets.

References Cited

UNITED STATES PATENTS

| | | | |
|---|---|---|---|
| 1,718,673 | 6/1929 | Wettstein | 91—376 X |
| 1,770,193 | 7/1930 | Bragg et al. | 91—376 X |
| 3,021,181 | 2/1962 | Fitch | 303—21 |
| 3,093,422 | 6/1963 | Packer et al. | 303—21 |
| 3,176,459 | 4/1965 | Parker | 60—60 X |
| 3,223,459 | 12/1965 | Packer | 303—21 |
| 3,312,509 | 4/1967 | Highley | 303—21 |

MILTON BUCHLER, Primary Examiner

JOHN J. McLAUGHLIN, Jr., Assistant Examiner

U.S. Cl. X.R.

60—60; 91—376; 303—6, 68, 71